United States Patent [19]
Bergeron

[11] Patent Number: 5,143,027
[45] Date of Patent: Sep. 1, 1992

[54] REED VALVES FOR TWO STROKE ENGINES

[75] Inventor: Robert M. Bergeron, Derry, N.H.

[73] Assignee: Land & Sea, Inc., North Salem, N.H.

[21] Appl. No.: 694,441

[22] Filed: May 1, 1991

[51] Int. Cl.$^5$ .............................................. F02B 75/02
[52] U.S. Cl. ................................ 123/65 V; 123/73 V; 137/845; 137/855
[58] Field of Search ............... 137/845, 852, 855; 123/73 V, 65 V

[56] References Cited

U.S. PATENT DOCUMENTS

| Re. 30,425 | 11/1980 | Boyesen | 123/73 AA |
|---|---|---|---|
| 157,791 | 12/1874 | Cameron . | |
| 861,566 | 7/1907 | Wiki . | |
| 919,036 | 4/1909 | Langer . | |
| 939,549 | 11/1909 | Reineking . | |
| 2,669,979 | 2/1954 | Kiekhaefer | 123/73 V |
| 2,689,522 | 9/1955 | Kiekhaefer . | |
| 2,788,778 | 4/1957 | Kiekhaefer | 123/73 V |
| 3,905,340 | 9/1975 | Boyesen | 123/73 A |
| 3,905,341 | 9/1975 | Boyesen | 123/73 R |
| 4,000,723 | 1/1977 | Boyesen | 123/73 AA |
| 4,051,820 | 10/1977 | Boyesen | 123/73 A |
| 4,062,331 | 12/1977 | Boyesen | 123/73 B |
| 4,143,626 | 3/1979 | Boyesen | 123/73 A |
| 4,161,163 | 7/1979 | Boyesen | 123/73 A |
| 4,202,298 | 5/1980 | Boyesen | 123/73 R |
| 4,202,299 | 5/1980 | Boyesen | 123/73 A |
| 4,228,770 | 10/1980 | Boyesen | 123/73 V |
| 4,235,206 | 11/1980 | Boyesen | 123/73 V |
| 4,294,202 | 10/1981 | Boyesen | 123/73 PP |
| 4,388,895 | 6/1983 | Boyesen | 123/73 PP |
| 4,389,982 | 6/1983 | Boyesen | 123/73 R |
| 4,395,978 | 8/1983 | Boyesen | 123/73 R |
| 4,474,145 | 10/1984 | Boyesen | 123/73 PP |
| 4,696,263 | 9/1987 | Boyesen | 123/65 V |
| 5,036,806 | 8/1991 | Rarick | 137/855 |

*Primary Examiner*—David A. Okonsky
*Attorney, Agent, or Firm*—Davis, Bujold & Streck

[57] ABSTRACT

The invention provides improved reed constructions for use in a reed valve assembly suitable for use in the induction porting of two-stroke internal combustion engines. The reeds incorporate improved hinge designs and dual-stage reed arrangements in which both primary and secondary reeds incorporate ports which do not overlap one another to improve flow through the dual-stage reed assembly involved.

17 Claims, 2 Drawing Sheets

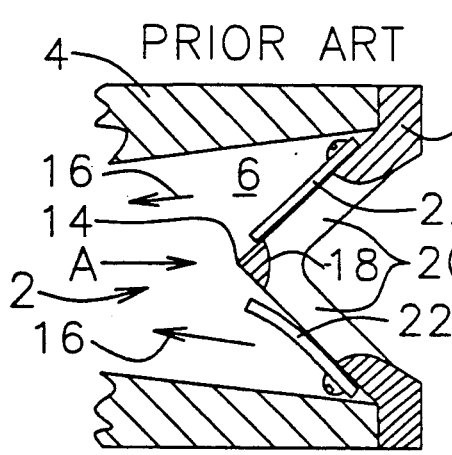
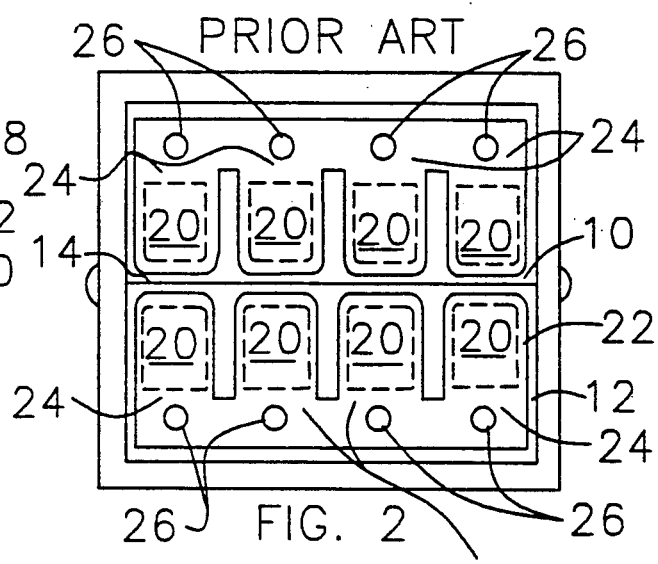
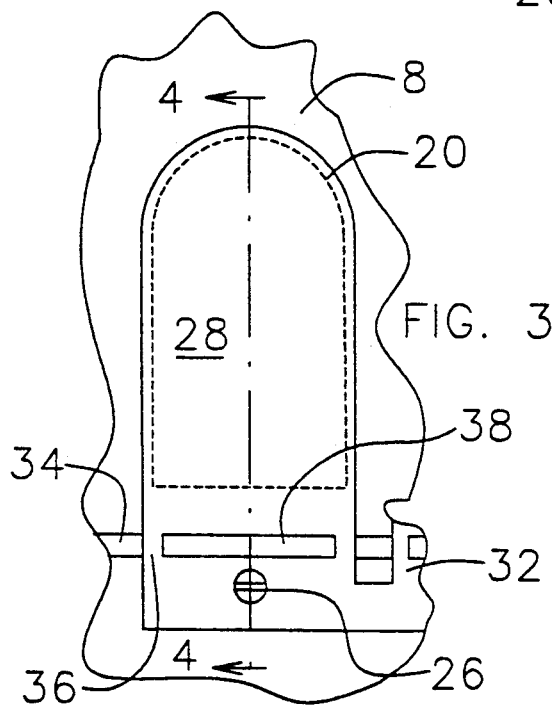
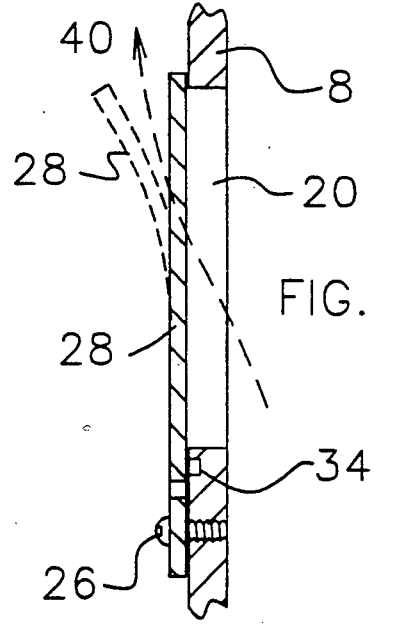
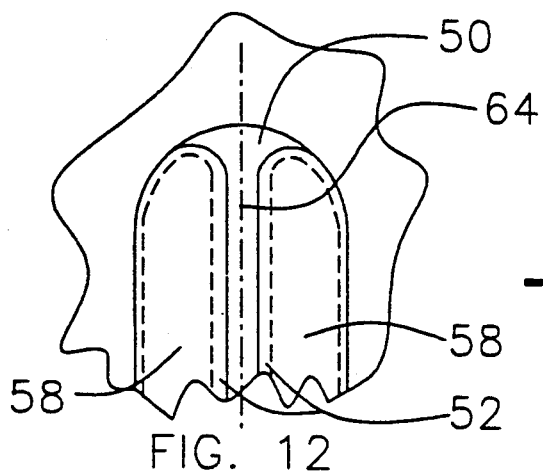
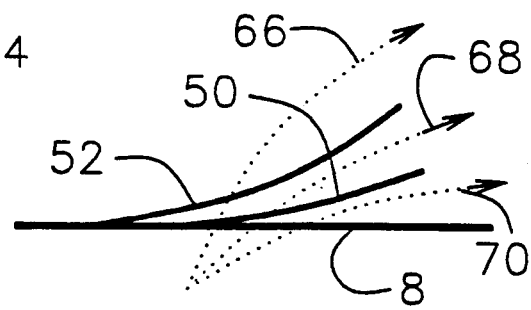

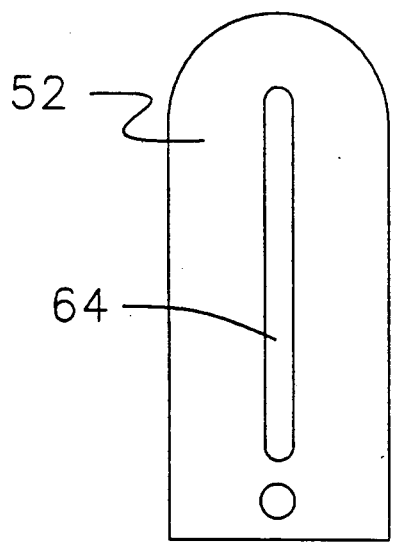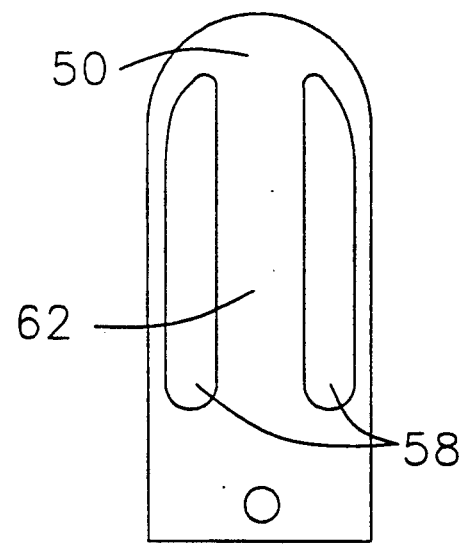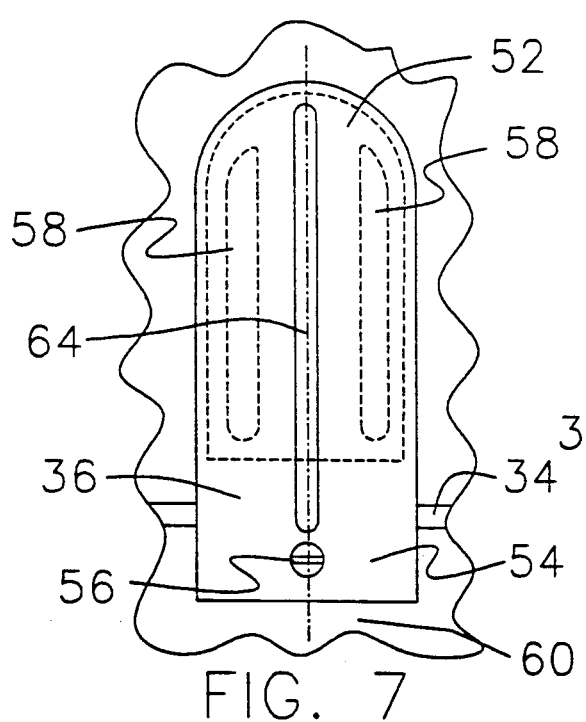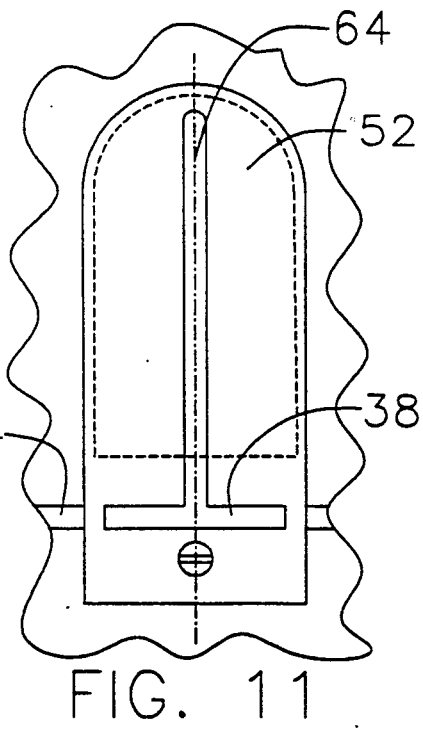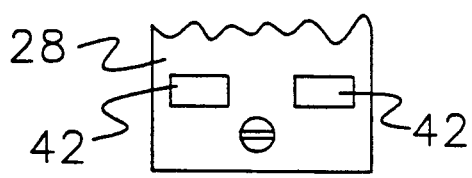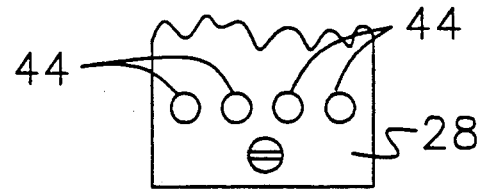

REED VALVES FOR TWO STROKE ENGINES

This invention relates to improved reed valve constructions for intake ports of two stroke engines and particularly, but not exclusively, to such reed valve constructions with improved hinging arrangements and to improved dual-stage reeds.

It has been proposed in the prior art to facilitate the hinging of reed valves used to control induction through the intake ports of two stroke engines by reducing the width of the reeds at the desired location of the hinges thereby to reduce the force necessary to lift the reed from the reed support body to permit flow through the port normally closed by the reed. Such reeds may have a tear drop shape and are subject to excessive torsional twisting as they open and close, as a result of the reduction in the width of the reeds at their hinges.

Dual-stage reeds are also well known in the prior art. Perhaps the most pertinent of these to the present invention is the design typified in U.S. Pat. No. 4,051,820 to Boyesen. In this patent a primary relatively thick reed overlies a port in a valve body with substantially its entire perimeter in contact with the valve seat. The primary reed has a port therein which is of a size smaller than the port in the housing. This primary reed port is controlled by a secondary reed which covers it, is smaller in area and is more flexible than the primary reed. This greater flexibility is achieved by using a thinner material for the secondary reed than for the primary reed, both of which are constructed with similar materials.

The dual-stage reed constructions typified by the constructions of U.S. Pat. No. 4,051,820 have the disadvantages of a relatively high spring rate in the hinge area resulting in limited reed life and undesirably high forces needed to lift the reed from the valve body to open the port therein. In addition, the secondary reed tends to mask flow through the port of the primary reed as that flow can only occur along the periphery of the secondary reed.

The requirement for the full perimeter of the primary reed to be in contact with the associated valve seat of the valve body excludes the possibility of incorporating a groove in the valve body adjacent the hinge area of the reed to accommodate any foreign matter which may accumulate. In these circumstances the accumulation of such foreign matter in the hinge area will prevent the reed from closing properly against the valve seat.

It is an object of the present invention to overcome limitations in hinging arrangements in the prior art in both single and dual-stage reed valves and to improve flow through a ported primary reed past a secondary reed in a dual-stage reed structure.

According to the invention there is provided a reed for use in a reed valve in an intake of a two-stroke internal combustion engine comprising a resilient flat elongate member defining a central longitudinal axis having a base end portion by which the reed may be attached to a reed valve body, a hinge area longitudinally contiguous with the base end portion and a free end portion at an opposite end; wherein
the hinge area is of reduced transverse cross-sectional area relative to the cross-section of the constant width defined by the lateral edges.

According to the invention there is also provided a reed for use in a reed valve in an intake of a two-stroke internal combustion engine comprising a resilient flat elongate member defining a central longitudinal axis having a base end portion by which the reed may be attached to a reed valve body, a hinge area longitudinally contiguous with the base portion, a port covering portion and a free end portion at an opposite end;
the member being of a constant thickness throughout; wherein:
the hinge area is of reduced transverse cross-sectional area relative to the cross-section of the port covering portion.

According to the invention there is also provided a reed for use in a reed valve in an intake of a two-stroke internal combustion engine comprising a resilient flat elongate member defining a central longitudinal axis having a base end portion by which the reed may be attached to a reed valve body, a hinge area contiguous with the base end portion longitudinally of the reed and a free end portion at an opposite end;
the member being of a constant thickness throughout; wherein:
a port covering portion of the reed, between the hinge area and the free end portion, defines at least two openings therethrough, one on either side of the axis.

The invention will now be described, by way of example, with reference to the accompanying drawings:

FIG. 1 is a diagrammatic cross-section through a reed valve assembly in a two stroke intake port typical of the prior art;

FIG. 2 is an elevation taken in the direction of the arrow A of FIG. 1 with the intake manifold omitted;

FIG. 3 is plan view of a first embodiment of reed valve according to the present invention;

FIG. 4 is a cross-section on section 4—4 of FIG. 3;

FIG. 5 is a fragmentary plan view of a second embodiment of reed valve according to the present invention;

FIG. 6 is a fragmentary plan view of a third embodiment of reed valve according to the present invention;

FIG. 7 is a plan view of the dual-stage reed valve of a fourth embodiment of the present invention;

FIG. 8 is a plan view of the secondary reed of the fourth embodiment of the present invention;

FIG. 9 is a plan view of the primary reed of the fourth embodiment according to the present invention;

FIG. 10 is a diagrammatic illustration of the various flow paths through the dual-stage reed valve construction of the fourth embodiment of the present invention;

FIG. 11 is a plan view of the dual-stage reed valve of a fifth embodiment of the present invention; and FIG. 12 is a plan view of the dual-stage reed valve of a sixth embodiment of the present invention.

With reference first to FIGS. 1 and 2 which diagrammatically present a typical example of a prior art reed valve construction to control flow through the intake port of a high-speed two stroke internal combustion engine, a valve assembly 2 is received in a housing 4 defining an intake duct 6 leading to an intake port of the engine. The valve assembly 2 has a valve body 8 having convergent faces 10 and 12 joined in an apex 14 facing the intake port which lies in the direction of arrow 16, the apex being formed by a transverse member 18.

Each convergent face 10 and 12 defines four identical ports 20 (shown in ghost) each closed by a resilient reed 22 with the reeds of each convergent face 10 and 12 in interconnected at their bases 24 to form two reed petals each defining four reeds. The reeds are attached to the valve assembly by screws 26 with the interconnection of the reeds serving to align the reeds with their associated ports without inhibiting their operation as individual reeds.

With reference to FIG. 1, reed 22 in the upper part of the drawing is shown closed while reed 22 in the lower part of the drawing is shown open to permit flow through its associated port. It will be appreciated that in normal operation the flexing of all of the reeds on both sides of the valve will always be substantially the same depending on the operating condition of the valve.

It will be appreciated that there is no special significance to the choice of eight ports or to the exact symmetry of the valve body and its ports. In addition, there is no particular significance to the illustration of the prior art being based on a reed petal as opposed to a plurality of completely independent reeds.

With reference now to the present invention, the first embodiment will be described with reference to FIGS. 3 and 4. With this and the following embodiments the valve body is essentially the same as that described with reference to the prior art, although there has been added a groove traversing the valve body 8 adjacent the hinge area of the reeds in order to accommodate extraneous matter (dirt) which may find its way between the reed and the valve body in the area of the hinge. This groove may be located between the attachment means (e.g. screw 26) and the location of the hinge, immediately under the hinge area or between the port 20 and the hinge. The preferred location is closely adjacent the attachment screw 26 in order to maximize the ability of the groove to prevent extraneous matter from effecting the sealing of reed against the seal face of the valve body.

In the first embodiment, a valve body 8 defining a port 20 (shown in ghost in FIG. 3) is covered by a reed 28 forming a part of a reed petal 30 with the next adjacent reed being reed 32. In this embodiment, extraneous matter collection groove 34 is formed in the valve body 8 between the port 20 and the hinge area 36 of the reed 28 which is attached to the valve body 8 by screw 26. The reed 28 is of substantially constant width throughout its length and is of a constant thickness. It will be appreciated that although the free end of the reed 28 may carry some curved corners, be semi-circular or be of other curved form at its free end, the reed is of substantially constant width throughout its length. In the hinge area 36, of the reed 28, a transverse slot 38 is formed, intermediate the side (lateral) edges of the reed, to provide dual hinges one adjacent each of those side edges. This facilitates easy flexure of the reed 28 in the hinge area 36 while avoiding the torsional distortion associated with the tear drop formation of the waisted form of prior art reeds hereinbefore discussed. Such a construction avoids not only the torsional twist but also the tearing associated with early failure of the tear drop shaped reeds.

FIG. 4 shows, in ghost, the reed 28 in its open position with the flow through the port being indicated by arrow 40. Of course, it will be appreciated, by those skilled in the art, that the reed 28 could be individual and need not be a part of a petal 30 carrying a plurality of reeds.

The second embodiment, as illustrated in FIG. 5, differs from FIGS. 3 and 4 by the transverse slot 38 being divided into two longitudinally aligned slots 42 which together form the hinge area 36 of the petal 28.

The embodiment of the invention as illustrated in FIG. 6 is a variant of the embodiment shown in FIG. 5 in which the hinge area 36 is defined by a transversely aligned plurality of holes 44 which together function to provide a hinge arrangement similar to that provided by a slot 38 and slots 42 of the first and second embodiments respectively.

The fourth embodiment of the invention will now be described with reference to FIGS. 7, 8, 9 and 10. This embodiment is a dual-stage construction in which a primary reed 50 covers a port, similar to a port 20 of the prior art, in a valve body similar to the valve body 8, also of the prior art. A secondary reed 52 of substantially the same area and dimension as the primary reed is superimposed upon the primary reed and the two together are fixedly attached at their bases 54, via a screw 56, to the valve body. In this construction, the groove 34 and hinge area 36 are coincident with one another. The primary reed 50 defines a pair of slots 58 extending longitudinally of the primary reed symmetrically about the longitudinal axis 60 of that reed. The area of the slots 58 is smaller than the area of the port in the valve body corresponding to the port 20 of the valve body 8 of the prior art. The ports 58 do not overly the groove 34. Between the ports 58 is a longitudinally extending portion 62 of the primary reed 50. Although not shown with respect to the fourth embodiment, it will be appreciated that the primary reed could incorporate the hinging arrangements of the first, second and third embodiments.

The secondary reed 52 defines a longitudinally extending slot 64 which does not extend transversely beyond the portion 62 and which extends longitudinally into the hinge area 36, thereby to act, in hinge area 36, in the manner similar to the slot 38, slots 42 or holes 44 by reducing the transverse cross-sectional area of the reed 52 in this hinge area 36.

It will be appreciated that in an embodiment not specifically described herein, in which only the increased flow stemming from a multiple port of the primary reed and the longitudinal slot porting of the secondary reed is desired, the extension of the slot 64 into the hinge area of the secondary reed could be omitted without departing from the spirit of this particular aspect of the present invention.

As with other embodiments of the present invention, the preferred material for the reeds is a glass fiber reinforced epoxy of a constant thickness for any individual reed. In the dual-stage reed valve structure, such as that of this fourth embodiment, the primary reed is constructed of a material of a thickness to provide an opening of the port, it normally closes in the valve body 8, under the influence of a decrease in pressure in the intake port attendant high-speed engine operation while being sufficiently rigid to remain closed under the influence of a decrease in pressure in the intake attendant low speed engine operation. The secondary reed is chosen to have a flexibility, primarily by using a material of less thickness, to be sufficiently flexible to open the ports 58 in the primary reed 50 under the influence in the decrease in pressure in the intake port attendant engine operation during both said high speed and said low speed operation. The provision of the slot 64 lying between the slots 58 provides a greater area for flow, past the secondary reed, than is possible in the prior art represented, for example, by U.S. 4,051,820. This results from the flow being able to take advantage of the total perimeter of the secondary reed as well as the perimeter of the slot 64 in the secondary reed. In flow testing, this improvement has shown between a five and ten percent increase in flow which translates in an improvement in engine performance approaching similar magnitude.

Such an increase in performance would also be apparent in variants referred to above in which the slot 64 does not extend into the hinge area 36.

In this connection, attention is drawn to FIG. 10 which diagrammatically shows the various flows. Flows 66 and 68, through slots 64 and 58 respectively, occur whenever the secondary reed 52 is open, whether or not the primary reed 50 is open. In the prior art, flow 66 does not exist. In addition, when the primary reed 50 is open, flow 70 occurs through the associated port past the perimeter of the that primary reed 50.

The fifth embodiment, as illustrated in FIG. 11, is in effect, the utilization of a secondary reed 52 which combines the transverse slot 38 in the hinge area with the longitudinal slot 64 joining and extending therefrom to provide the features of the secondary reed 52 of the fourth embodiment as well as the superior hinge arrangements of the single reed of the first embodiment. Of course, those skilled in the art will appreciate that a slot similar to the slot 38 could also be incorporated in the primary reed 50 of this fifth embodiment to provide the advantageous hinging arrangements with respect to the primary reed. In this embodiment, the groove 34 is coincident with the slot 38. However, as will be appreciated, that groove 34 could be located in any of the locations previously referred to above.

The sixth embodiment of the invention, as illustrated in FIG. 12, is a variation of the fourth embodiment illustrated in FIG. 7 in which the longitudinal slot 64 of the secondary reed 52 extends to the free end of the end 52 effectively dividing the reed into two reeds one covering and closing each of the two slots 58 of the primary reed 50. It will be appreciated that a number of variations of this sixth embodiment are possible including the termination of the slot 64, sufficiently far along the reed from the attachment to the valve body by screw 56, for a transverse slot 38 or its equivalent to be incorporated adjacent that screw 56 in the hinge area, incorporation of a slot 38 or its equivalent in each of the two parts of the secondary reed 38 in the hinge area 36 and/or the incorporation of a slot corresponding to slot 38 or its equivalent in the underlying primary reed 50.

While all of the embodiments of the present invention have been described in the presence of a groove 34 for accommodating extraneous matter that may find its way between the reeds and the valve body, it will appreciated that such a groove is not essential for the improved operation resulting from the hinging improvements proposed by the present invention or the improved flow resulting from the particular slotted arrangements in the dual-reed embodiments. In fact, in the presence of the slot 38, the groove 34, which is common in the prior art, is of diminished value as much of the extraneous matter which that groove would house will pass through the slot 38 or the equivalent openings in other embodiments.

As used herein, reference to a reed shall be construed to extend to that reed when it forms a part of a reed petal assembly in which a plurality of reed petals, each corresponding in function to an individual reed, are interconnected adjacent their base.

I claim:

1. A reed for use in an intake of a two-stroke internal combustion engine comprising a resilient flat elongate member defining a central longitudinal axis, having a base end portion by which the reed may be attached to a reed valve body, a hinge area longitudinally contiguous with the base end portion and a free end portion opposite the base end; wherein
   the hinge area and the free end portion are defined by a pair of substantially parallel lateral edges, said hinge area further having at least one completely closed opening therein extending through the member to define at least two laterally spaced hinge portions connecting the base end portion with the remainder of the member.

2. A reed according to claim 1 wherein the at least one opening is an elongate opening extending laterally of the member to define, together with the lateral edges, two identical said hinge portions.

3. A reed according to claim 1 wherein the member being of a constant thickness throughout and having a constant width defined by the lateral edges of the member extending from the base end portion to the free end portion and the free end portion has an at least partly curved outline merging with the lateral edges.

4. A reed for use in a reed valve in an intake of a two-stroke internal combustion engine comprising a resilient flat elongate member defining a central longitudinal axis having a base end portion by which the reed may be attached to a reed valve body, a hinge area longitudinally, contiguous with the base portion, a port covering portion and a free end portion opposite the base end portion;
   the member being of a constant thickness throughout; wherein:
   the hinge area is of reduced lateral cross-sectional area relative to the lateral cross-sectional area of the port covering portion, said hinge area and said port covering portion having coincident, substantially parallel, lateral edges.

5. A reed according to claim 4 in combination with a reed valve body having means for affixing the base end portion of the reed to the body wherein the base end portion has an extent, longitudinally of the reed, defined by the extension of said means along the reed.

6. A reed for use in a reed valve in an intake of a two-stroke internal combustion engine comprising a resilient flat elongate member defining a central longitudinal axis having a base end portion by which the reed may be attached to a reed valve body, a hinge area contiguous with the base end portion longitudinally of the reed and a free end portion opposite the base end portion;
   the member being of a constant thickness throughout; wherein:
   a port covering portion of the reed, between the hinge area and the free end portion, defines at least two openings therethrough, one being completely to one side of the axis and another being completely to the other side of the axis with the area of the port covering portion lying on the axis being devoid of any openings.

7. A reed according to claim 6, in the form of a primary reed, in combination with a secondary reed, for use as a dual-stage reed valve in an intake of a two-stroke internal combustion engine, the secondary reed comprising a resilient flat elongate member defining a central longitudinal axis having a base end portion at one end by which the secondary reed may be attached to a reed valve body, a hinge area longitudinally contiguous with the base end portion and free end portion at an opposite end;

the member of the secondary reed being of a constant thickness throughout; wherein:

a port covering portion of the secondary reed has at least between the hinge area and the free end portion thereof at least one opening therethrough which does not overlap the openings in the primary reed when the base portions of the reeds are superposed one on the other with their axes coincident laterally of the reeds.

8. A reed combination according to claim 7 wherein the at least two openings are two openings extending longitudinally of the primary reed symmetrically about the axis of that reed and defining therebetween an elongate central area of the reed and the at least one opening of the secondary reed is an elongate single opening overlying the elongate central area when the reeds are superposed as specified in claim 7.

9. A reed combination according to claim 7 in combination with a reed valve body wherein the reed combination is affixed to the body to close a port therein.

10. A reed combination according to claim. 7 wherein the reeds are of the same size and outer shape with the secondary reed having greater flexibility that the primary reed.

11. A reed combination according to claim 7 wherein the hinge area of at least one of the primary and secondary reeds has at least one opening therein extending through the member to define at least two laterally spaced hinge portions connecting the base portion with the remainder of the member.

12. A reed combination according to claim 11 wherein the at least one opening is an elongate opening extending laterally of the member to define together with the lateral edges two identical said hinge portions.

13. A reed combination according to claim 7, wherein the hinge area of at least one of the primary and secondary reeds is of reduced lateral cross-sectional area relative to the lateral cross-sectional area of the port covering portion of the primary reed.

14. A reed combination according to claim 13 in combination with a reed valve body having means for affixing the base portion of the reeds to the body wherein the base portions have an extent, longitudinally of the reeds, defined by the extension of said means along the reeds.

15. A reed according to claim 2 wherein the elongate opening joins a longitudinally extending opening centered on the axis.

16. A reed combination according to claim 8 wherein the elongate single opening joins a transverse elongate opening in the hinge area of the secondary reed which defines two identical laterally spaced hinge portions.

17. A reed combination according to claim 8 wherein the elongate single opening extends through the free end portion to divide the secondary reed into two reed portions each overlying one of the two openings of the primary reed.

* * * * *